US005445095A

United States Patent [19]
Reed et al.

[11] Patent Number: 5,445,095
[45] Date of Patent: Aug. 29, 1995

[54] POLYMER/RIBLET COMBINATION FOR HYDRODYNAMIC SKIN FRICTION REDUCTION

[75] Inventors: Jason C. Reed, Hampton; Dennis M. Bushnell, Hayes, both of Va.

[73] Assignee: The United States of America as represented by the Administrator of the National Aeronautics and Space Administration, Washington, D.C.

[21] Appl. No.: 892,066

[22] Filed: May 28, 1992

Related U.S. Application Data

[63] Continuation of Ser. No. 567,025, Aug. 14, 1990, abandoned.

[51] Int. Cl.⁶ .................................................. B64C 1/38
[52] U.S. Cl. ..................................... 114/67 A; 244/130
[58] Field of Search ........................... 114/67 A, 67 R; 244/130, 200

[56] References Cited

U.S. PATENT DOCUMENTS

| | | |
|---|---|---|
| 3,016,865 | 1/1962 | Eichenberger .................... 114/67 A |
| 3,732,839 | 5/1973 | Schuster et al. ............. 114/67 A X |
| 4,650,138 | 3/1987 | Grose ................................... 244/130 |
| 4,753,401 | 6/1988 | Bechert ................................ 244/130 |
| 4,932,612 | 6/1990 | Blackwelder et al. ......... 244/200 X |

Primary Examiner—Edwin L. Swinehart
Attorney, Agent, or Firm—Kimberly A. Chasteen

[57] ABSTRACT

A process for reducing skin friction and inhibiting the effects of liquid turbulence in a system involving the flow of a liquid along the surface of a body, e.g. a marine vehicle, includes injecting a drag reducing polymer into the valleys of adjacent, evenly spaced, longitudinal grooves extending along the length of the surface of the body, so that the rate of diffusion of the polymer from individual grooves into the liquid flow is predictably controlled by the groove dimensions. When the polymer has diffused over the tips of the grooves into the near wall region of the boundary layer, the polymer effectively reduces the turbulent skin friction. A substantial drag reducing effect is achieved with less polymer than must be used to lower skin friction when the surface of the body is smooth.

3 Claims, 2 Drawing Sheets

POLYMER/RIBLET COMBINATION FOR HYDRODYNAMIC SKIN FRICTION REDUCTION

ORIGIN OF THE INVENTION

This is a continuation of application(s) Ser. No. 07/567,025 filed on Aug. 14, 1990, now abandoned.

The invention described herein was made jointly in the performance of work under a NASA contract and by an employee of the United States Government. In accordance with 35 U.S.C. 202, the contractor elected not to retain title.

BACKGROUND OF THE INVENTION

1. Field of the Invention

This invention relates generally to systems wherein a liquid flows along a surface of a body. It relates particularly to a process for reducing skin friction and inhibiting the effects of liquid turbulence.

2. Description of Related Art

Skin friction drag accounts for a sizable portion of the hull drag for both surface and fully submerged marine vehicles. Reducing this drag component would have the obvious advantages of increased speed and/or efficiency. One approach to skin friction drag reduction involves the use of long chain polymer molecules, which can reduce up to 80% of the skin friction under ideal circumstances.

Although polymers generate large friction reductions, their use on marine vehicles has been limited by the large mass injection rate needed to maintain a sufficiently high polymer concentration close to the surface of the body. Turbulent diffusion in the boundary layer rapidly disperses polymer after it is injected from the body, causing much of the polymer to leave the boundary region close to the surface where the polymer drag reduction mechanism operates. Under these conditions, the amount of polymer that must be injected is uneconomical when compared to the cost of fuel needed to overcome the drag.

Wells in "An Analysis of Uniform Injection of a Drag-reducing Fluid into a Turbulent Boundary Layer," *Viscous Draft Reduction* (*Proceedings of the Symposium on Viscous Draft Reduction*), 1969, p. 361, has shown that a distributed injection of polymer over the entire surface rather than discrete injection of polymer from holes or a series of slots can produce local polymer concentration high enough to result in large drag reduction, but at less than one-tenth of the mass injection rate required by a discrete injection. While this approach allows the polymer injection rate to become economical compared to fuel costs, it also requires a uniformly porous surface over the entire body of the vehicle. This is difficult, if not totally unfeasible, to achieve on large vessels such as ships and submarines. Wells makes no mention of using the polymer in combination with a grooved surface to achieve better drag reduction.

Walsh, U.S. Pat. No. 4,706,910, discloses a method of reducing drag which uses micro-geometry longitudinal grooving of the flow surface. Walsh differs from the present invention by using the grooves alone to reduce surface drag, whereas the present invention uses surface grooves in combination with polymer to reduce the drag.

Polymers have been combined with small longitudinal grooves (riblets) in two studies by the United States Navy, and by K. S. Choi, et al of British Maritime Technology. All the experimenters were looking for possible synergistic effects between the riblet and polymer mechanisms. Their results were as follows:

(1) Both sets of Navy experimenters, Reidy and Anderson, "Drag Reduction for External and Internal Boundary Layers using Riblets and Polymers," AIAA Paper No. 88-0318; and Beauchamp and Phillips, "Riblet and Polymer Drag Reduction on an Axisymetric Body," AIAA Paper No. 88-0138, used a "polymer ocean" in their experiments and did not inject the polymer from the test surface. They neither contemplated nor provided data on the use of the riblet surface to control the turbulent diffusion of the polymer near the test surface. Instead, these studies only indicated that there were additive skin friction reductions for polymer and riblet combinations. The Navy experimenters also theorized only one injection point on the surface. As a result, large amounts of polymer would be required to overcome the rapid diffusion of polymer out of the boundary layer close to the surface. Nor did they examine the geometry of the riblets. The present invention, however, combines a study of the optimal groove measurements with multiple injection sites to minimize the amount of polymer needed to reduce drag effectively and economically by using the groove properties to limit the problem of polymer diffusion.

(2) K. S. Choi, G. E. Gadd, H. H. Pearcey, A. M. Savill, and S. Svensson, "Drag Reduction With A Combined Use of Riblets and Polymer Coating," *Additive and Passive Devices: Combination Studies,* 1989, p. 271, coated the riblet surface with an ablative polymer material which slowly released polymer into the flow close to the surface. The slow release of the polymer from the surface was entirely a result of the nature of the polymer ablative coating, not the riblet geometry. Choi neither contemplated nor provided data pertaining to the use of the riblet geometry to control the polymer diffusion. Not only did this technique produce much less than optimum polymer drag reduction (10% vs. 80% possible, indicating inefficient release and dispersion), but over time the sharp groove peaks will be worn down. As a result, the grooves will become much less effective in reducing drag. In the present invention, polymer is injected into the grooves, not coated on the surface. The present invention is specifically designed to use the riblet geometry to control release of polymer after it has been injected.

SUMMARY OF THE INVENTION

The present invention is a process for reducing skin friction and inhibiting the effects of liquid turbulence in systems involving liquid flow along a surface of a body. It has special utility in the development of marine vehicles. According to the present invention, a drag reducing polymer is injected into longitudinal grooves on the surface of a hydrodynamic body. The polymer diffuses into the flow around the body at a rate controlled by the dimensions of the grooves. As the polymer reaches the near wall region of the boundary layer of the flow around the body at a point just above the grooved surface, the polymer begins to effectively reduce the turbulent skin friction. If the geometry and dimensions of the grooves are varied, the changes in the diffusion rate of the polymer produces different distributed injection characteristics. Similarly, varying the number of injection sites also changes the amount of polymer needed for effective skin friction reduction.

BRIEF DESCRIPTION OF THE DRAWINGS

For a more complete understanding of the present invention, including its primary object and attending benefits, reference should be made to the Description of the Preferred Embodiments, which is set forth below. This description should be read together with the accompanying drawings, wherein.

DESCRIPTION OF THE PREFERRED EMBODIMENTS

Figure 1:
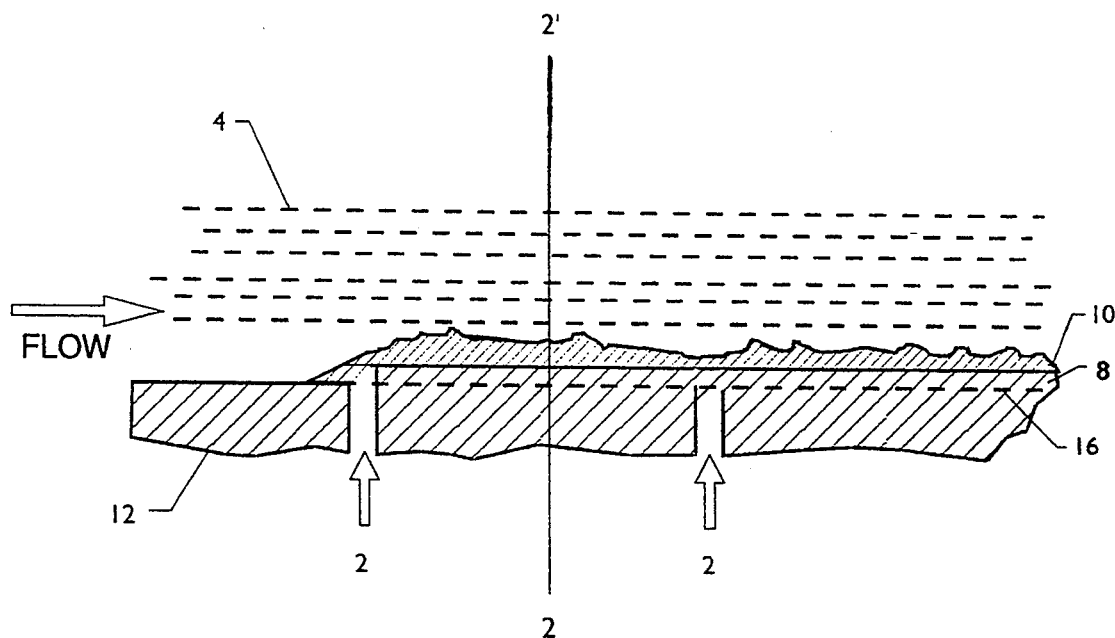
FIG. 1 represents an optimized flow pattern for a diffusing polymer in accordance with the present invention.

Referring now to the drawings, FIG. 1 represents a side view of the optimal flow pattern generated by riblets 8 and drag reducing polymer 10. The surface of body 12 contains riblets 8. Drag reducing polymer 10 is injected into riblets 8 from body 12 through widely spaced channels 2. As liquid 4 flows by riblets 8, drag reducing polymer 10 slowly diffuses out of riblets 8 and into liquid 4.

Figure 2:
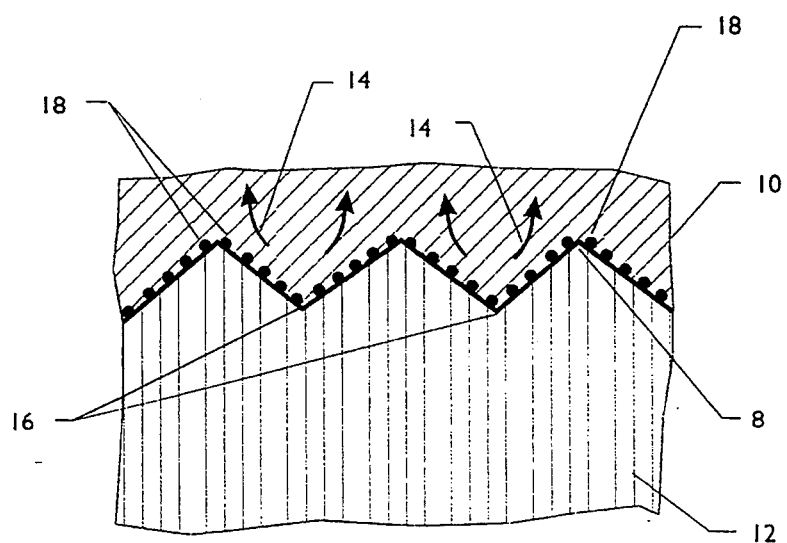
FIG. 2 is a cross sectional view of the optimized flow pattern of FIG. 1 showing the polymer rising out of riblets 8.

FIG. 2 represents a cross sectional view of FIG. 1 along line 2-2'. Arrows 14 representing low momentum flow demonstrate how drag reducing polymer 10 has risen out of riblets 8.

Figure 3:
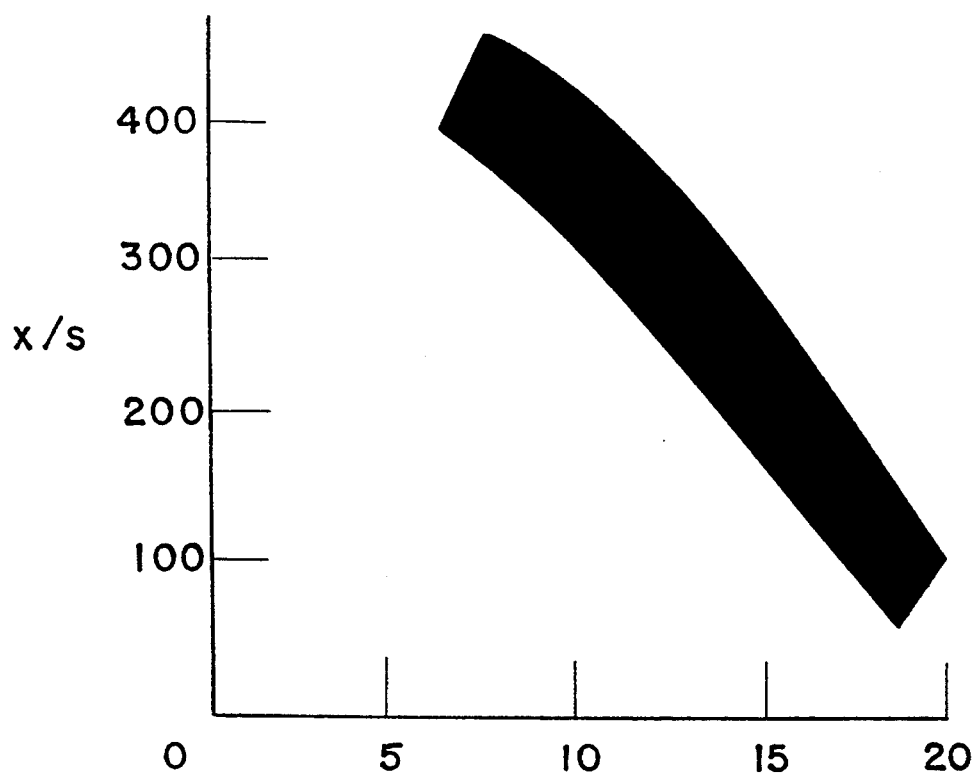
FIG. 3 graphically represents the effect of variation in width of the grooves or valleys between riblets.

FIG. 3 graphically represents how the size of riblets 8 influences the diffusion of dye, representing drag reducing polymer 10, from riblets 8. The viscous scaling, s+, is plotted against x/s, the number of riblet 8 widths that it takes until the dye has been completely diffused from riblets 8. The nondimensional units used demonstrate that as riblet 8 widths increase with the velocity of liquid 4 held constant, the viscous scaling increases and x/s decreases. Similarly, if the velocity of liquid 4 is increased and the riblet 8 width is held constant, s+ will increase and x/s decrease. This occurs because the velocity of liquid 4 and the riblet 8 widths are both proportional to the viscous scaling.

In the present invention, body 12 contains a multiplicity of adjacent, evenly spaced, longitudinal riblets 8. Riblets 8 can be a variety of geometries, such as triangular. See FIG. 2. Dimensions of riblets 8 must be scaled to the local viscous scaling, s+, which is a function of vehicle velocity and position of riblets 8 on the surface downstream from channels 2. Drag reducing polymer 10 is injected into valleys 16 of riblets 8 through channels 2. See FIG. 2. Drag reducing polymer 10 can be, for example, POLYDOX ® as marketed by Union Carbide Company, or any other high molecular weight, water soluble polymer suitable for the purpose. Channels 2 should be angled in a direction parallel to the flow of liquid 4 in order to put drag reducing polymer 10 as deeply as possible into valley 16 of riblet 8. Injection of drag reducing polymer 10 must be repeated at intervals along the length of body 12 because the volume of riblets 8 is finite and drag reducing polymer 10 will become depleted as it is slowly pulled from riblets 8 by turbulence. This is necessary for the function of the present invention because drag reducing polymer 10 must reach over the tips of riblets 8 into the near wall region of the boundary layer in order for drag reducing polymer 10 to effectively reduce the turbulent skin friction. See FIG. 1.

Riblets 8 produce a local turbulence intensity smaller than that of a simple flat surface. The walls of riblets 8 impart a transverse frictional force to any liquid passing through them. See FIG. 2. This makes for a quiescent flow that lowers the diffusion rate of that liquid into the flow above riblets 8. To produce the most effective low momentum flow for the present invention, the s+ of riblets 8 should be less than 20. See FIG. 3. Thus, drag reducing polymer 10 inside of riblets 8 is also affected by this lower local turbulence, and diffuses more slowly into liquid 4 than when placed on a flat surface. By changing the dimensions of riblets 8, the local turbulence intensity can be varied. As a result, the rate ,at which drag reducing polymer 8 diffuses can be controlled, as shown by the dye in FIG. 3. Optimum riblet 8 scaling will produce an effect whereby drag reducing polymer 10 is slowly distributed over a predictable length at a predictable rate. Drag reducing polymer 10 can be injected into riblets 8 in much less quantity than needed for a comparably sized body with a flat surface, because the turbulence supplied by the flat body would more rapidly diffuse much more of drag reducing polymer 10 away from the near wall boundary layer where effective skin friction reduction occurs. Riblets 8 also act as a storage area for drag reducing polymer 10 until it is diffused. With correct scaling of riblets 8, a predictable amount of drag reducing polymer 10 slides down the length of valley 16 of riblet 8. This allows diffusion of equal amounts of drag reducing polymer 10 over a broad area of the surface. Therefore, the drag reducing polymer acts as if there was distributed injection over the entire length of body 12, without the requirement of a porous surface over the entire vessel. See FIG. 1.

Alternate embodiments include varying the geometry of riblet 8 to produce different distributed injection characteristics for use in different types of turbulence. Moreover, any of a number of methods to place drag reducing polymer 10 in riblets 8 are feasible, including slots, several rows of small holes, slots with a shroud to produce injections directed parallel to the surface, as well as channels 2. Riblets 8 can also contain a rough surface or small surface projections, 18, as illustrated diagrammatically in FIG. 2, such as baffles, which act to increase the frictional holding power of the riblets, allowing riblets 8 be deepened without a change in other characteristics.

The present invention produces skin friction reductions as large as any polymer method applicable to marine vehicles. In addition, it is capable of achieving this drag reduction at mass injection requirements considerably less than that of normal methods. This approaches the efficiency of distributive injection without the need of a porous injection surface over the entire wetted area of the vehicle.

It should become obvious to those skilled in the art that this invention is not limited to the preferred embodiments shown and described.

What is claimed as new and desired to be secured by Letters Patent to the United States is:

1. A process for reducing skin friction and inhibiting effects of liquid turbulence, comprising
   providing a body having an exterior surface over which a fluid flows,
   forming a multiplicity of adjacent, evenly spaced, longitudinal grooves extending along an entire length of the surface, such that the grooves are parallel to the flow over the surface, providing each of the multiplicity of grooves with small surface projections such that each groove has increased frictional holding power, injecting a drag reducing polymer into each individual groove valley at multiple points along each groove such that amounts of the polymer needed to reduce skin friction along the entire length of the surface are minimized, and controlling the rate of diffusion of the polymer from each groove into the liquid by the dimensions of each groove.

2. A process for reducing skin friction and inhibiting effects of liquid turbulence, comprising providing a body having an exterior surface over which a fluid flows, forming a multiplicity of adjacent, evenly spaced, longitudinal grooves extending along an entire length of the surface, such that the grooves are parallel to the flow over the surface, injecting a drag reducing polymer into the individual groove valleys at multiple points along each groove such that amounts of the polymer needed to reduce skin friction along the entire length of the surface are minimized, infecting the drag reducing polymer by means of an array of slots or holes angled such that the injected polymer is directed parallel to each groove, in the direction of the liquid flow, and limiting the rate of diffusion of the polymer from each groove into the liquid by the dimensions of each groove.

3. The process of claim 2, further including the step of providing each of the multiplicity of grooves with small surface projections such that each groove has increased frictional holding power.

* * * * *